United States Patent
Hansson et al.

(10) Patent No.: US 10,562,372 B2
(45) Date of Patent: Feb. 18, 2020

(54) SYSTEMS AND METHODS FOR STARTING-UP A VEHICULAR AIR-CONDITIONING SYSTEM

(71) Applicant: Bergstrom, Inc., Rockford, IL (US)

(72) Inventors: Bjorn M. Hansson, Leaf River, IL (US); Eric A. Elias, Machesney Park, IL (US)

(73) Assignee: Bergstrom, Inc., Rockford, IL (US)

( * ) Notice: Subject to any disclaimer, the term of this patent is extended or adjusted under 35 U.S.C. 154(b) by 210 days.

(21) Appl. No.: 15/256,109

(22) Filed: Sep. 2, 2016

(65) Prior Publication Data
US 2018/0065446 A1  Mar. 8, 2018

(51) Int. Cl.
*B60H 1/00* (2006.01)
*B60H 1/32* (2006.01)

(52) U.S. Cl.
CPC ....... *B60H 1/00978* (2013.01); *B60H 1/3205* (2013.01); *B60H 2001/3238* (2013.01);
(Continued)

(58) Field of Classification Search
CPC ......... B60H 1/00978; B60H 2001/3238; F24F 11/38; F25B 2700/15; F25B 2700/151
See application file for complete search history.

(56) References Cited

U.S. PATENT DOCUMENTS 2,722,050 A  11/1955  Shank
2,789,234 A  6/1956  Lambert et al.
(Continued)

FOREIGN PATENT DOCUMENTS

CN  1468409 A  1/2004
CN  2883071 Y  3/2007
(Continued)

OTHER PUBLICATIONS

Alfa Laval Website http://www.alfalaval.com/ecore-Java/WebObjects/ecoreJava.woa/wa/shoNode?siteNodeIID=1668&cont . . . ; date last visited May 18, 2007; 1 page.
(Continued)

*Primary Examiner* — Keith M Raymond
*Assistant Examiner* — Nael N Babaa
(74) *Attorney, Agent, or Firm* — Morgan, Lewis & Bockius LLP

(57) ABSTRACT

The various implementations described herein include methods, devices, and systems for starting-up a vehicle air-conditioning system. In one aspect, a method is performed at a vehicle air-conditioning system including a blower fan, a condenser fan, and a compressor electrically coupled to a battery system. The method includes: (1) starting the blower fan; (2) after starting the blower fan, measuring a first current drawn from the battery system, the first current indicative of current drawn by the blower fan; (3) in accordance with a determination that the first current meets predefined criteria, starting the condenser fan; (4) after starting the condenser fan, measuring a second current drawn from the battery system, where the difference between the second current and the first current is indicative of current drawn by the condenser fan; and (5) in accordance with a determination that the second current meets predefined second criteria, starting the compressor.

20 Claims, 7 Drawing Sheets

(52) U.S. Cl.
CPC ............... *B60H 2001/3272* (2013.01); *B60H 2001/3277* (2013.01); *B60H 2001/3282* (2013.01); *B60H 2001/3292* (2013.01); *F25B 2700/15* (2013.01)

(56) References Cited

U.S. PATENT DOCUMENTS

| | | |
|---|---|---|
| 3,176,502 A | 4/1965 | Cizek et al. |
| 3,225,819 A | 12/1965 | Stevens |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,391,321 A | 7/1983 | Thunberg |
| 4,412,425 A | 11/1983 | Fukami et al. |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno |
| 5,230,719 A | 7/1993 | Berner et al. |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergman, Jr. et al. |
| 5,528,901 A | 6/1996 | Willis |
| 5,562,538 A | 10/1996 | Suyama |
| 5,586,613 A | 12/1996 | Ehsani |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,752,391 A | 5/1998 | Ozaki et al. |
| 5,761,918 A | 6/1998 | Jackson et al. |
| 5,775,415 A | 7/1998 | Yoshini et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Nakagawa et al. |
| 5,982,643 A | 11/1999 | Phlipot |
| 5,996,363 A | 12/1999 | Kurachi et al. |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,125,642 A | 10/2000 | Seener et al. |
| 6,134,901 A | 10/2000 | Harvest et al. |
| 6,152,217 A | 11/2000 | Ito et al. |
| 6,185,959 B1 | 2/2001 | Zajac |
| 6,193,475 B1 | 2/2001 | Rozek |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,232,687 B1 | 5/2001 | Hollenbeck et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Zeigler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |

(56) References Cited

U.S. PATENT DOCUMENTS

| | | |
|---|---|---|
| 7,932,658 B2 | 4/2011 | Ionel |
| 8,001,799 B2 | 8/2011 | Obayashi et al. |
| 8,141,377 B2 | 3/2012 | Connell |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 | 9/2014 | Nambara et al. |
| 8,841,813 B2 | 9/2014 | Junak et al. |
| 8,905,071 B2 | 12/2014 | Coombs et al. |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier |
| 9,783,024 B2 | 10/2017 | Connell et al. |
| 9,878,591 B2 | 1/2018 | Taniguchi et al. |
| 2001/0010261 A1 | 8/2001 | Oomura et al. |
| 2002/0020183 A1 | 2/2002 | Hayashi |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0168449 A1 | 9/2004 | Homan et al. |
| 2004/0216477 A1* | 11/2004 | Yamasaki ............ F25B 1/10 62/216 |
| 2004/0221599 A1 | 11/2004 | Hille et al. |
| 2004/0250560 A1 | 12/2004 | Ikura |
| 2004/0256082 A1 | 12/2004 | Bracciano |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0235660 A1 | 10/2005 | Pham |
| 2005/0257545 A1 | 11/2005 | Ziehr et al. |
| 2006/0042284 A1 | 3/2006 | Heberle et al. |
| 2006/0080980 A1 | 4/2006 | Lee et al. |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2007/0295017 A1 | 12/2007 | Pannell |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0218530 A1 | 9/2010 | Melbostad et al. |
| 2010/0263395 A1 | 10/2010 | Adachi et al. |
| 2010/0293966 A1 | 11/2010 | Yokomachi |
| 2011/0088417 A1 | 4/2011 | Kayser |
| 2011/0120146 A1 | 5/2011 | Ota et al. |
| 2011/0126566 A1 | 6/2011 | Jones et al. |
| 2011/0174014 A1 | 7/2011 | Scarcella et al. |
| 2011/0308265 A1 | 12/2011 | Phannavong |
| 2012/0023982 A1 | 2/2012 | Berson et al. |
| 2012/0102779 A1 | 5/2012 | Beers et al. |
| 2012/0118532 A1 | 5/2012 | Jentzsch et al. |
| 2012/0133176 A1 | 5/2012 | Ramberg |
| 2012/0247135 A1 | 10/2012 | Fakieh |
| 2012/0297805 A1 | 11/2012 | Kamada et al. |
| 2012/0318014 A1 | 12/2012 | Huff et al. |
| 2013/0040549 A1 | 2/2013 | Douglas et al. |
| 2013/0091867 A1 | 4/2013 | Campbell et al. |
| 2013/0145781 A1 | 6/2013 | Liu |
| 2013/0167577 A1 | 7/2013 | Street |
| 2013/0181556 A1 | 7/2013 | Li et al. |
| 2013/0319630 A1 | 12/2013 | Yamamoto |
| 2014/0066572 A1 | 3/2014 | Corveleyn |
| 2014/0075973 A1 | 3/2014 | Graaf et al. |
| 2014/0102679 A1 | 4/2014 | Matsudaira et al. |
| 2014/0241926 A1 | 8/2014 | Fraser |
| 2014/0260358 A1 | 9/2014 | Leete et al. |
| 2014/0290299 A1 | 10/2014 | Nakaya |
| 2015/0059367 A1 | 3/2015 | Emo et al. |
| 2015/0158368 A1 | 6/2015 | Herr-Rathke et al. |
| 2015/0210287 A1 | 7/2015 | Penilla et al. |
| 2015/0236525 A1* | 8/2015 | Aridome .............. H02J 7/007 320/107 |
| 2015/0239365 A1 | 8/2015 | Hyde et al. |
| 2015/0306937 A1 | 10/2015 | Kitamura et al. |
| 2016/0089958 A1 | 3/2016 | Powell |
| 2016/0144685 A1 | 5/2016 | Ochiai et al. |
| 2016/0146554 A1 | 5/2016 | Bhatia et al. |
| 2016/0229266 A1 | 8/2016 | Maeda et al. |
| 2017/0211855 A1 | 7/2017 | Fraser et al. |
| 2017/0350632 A1 | 12/2017 | Hirao |

FOREIGN PATENT DOCUMENTS

| | | |
|---|---|---|
| CN | 201872573 U | 6/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| DE | 4440044 A1 | 5/1996 |
| DE | 197 45 028 A1 | 4/1999 |
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 10201004965 A1 | 6/2012 |
| DE | 10 2012 022564 A1 | 5/2014 |
| DE | 11 2015 000552 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 5/2011 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |

(56) References Cited

FOREIGN PATENT DOCUMENTS

| | | | | |
|---|---|---|---|---|
| JP | H10281595 | A | 10/1998 | |
| JP | 2000108651 | A | 4/2000 | |
| JP | 2005044551 | A | 4/2000 | |
| JP | 2002081823 | A | 3/2002 | |
| JP | 2005-033941 | A | 2/2005 | |
| JP | 2005-081960 | A | 3/2005 | |
| JP | 2006-264568 | A | 10/2006 | |
| JP | 2008220043 | A * | 9/2008 | ............ F25B 49/005 |
| JP | 2012017029 | A | 1/2012 | |
| JP | 2014226979 | A | 12/2014 | |
| KR | 20090068136 | A | 6/2009 | |
| WO | WO 89/09143 | A1 | 10/1989 | |
| WO | WO 99/61269 | | 12/1999 | |
| WO | WO 00/00361 | | 1/2000 | |
| WO | WO 2004/011288 | A1 | 2/2004 | |
| WO | WO 2006/082082 | A1 | 8/2006 | |
| WO | WO 2012/158326 | A1 | 11/2012 | |
| WO | WO 2013/113308 | A1 | 8/2013 | |
| WO | WO 2014/112320 | A1 | 7/2014 | |
| WO | WO 2014/180749 | A1 | 11/2014 | |
| WO | WO 2014/209780 | A1 | 12/2014 | |
| WO | WO 2015/076872 | A1 | 5/2015 | |

OTHER PUBLICATIONS

Anonymous: "NITE Connected Climate Controlled Transport Monitoring/Mobile Internet of Things UI Design/Mobil UI: Progress/Printeres/Internet of Things, User Inter . . . ," Oct. 19, 2016 retrieved from: URL:htps://za.pinterest.com/pin/192810427773981541/, 1 pg.
Bergstrom, Inc., International Search Report and Written Opinion, PCT/US2014/026687, dated Jul. 28, 2014, 12 pgs.
Bergstrom, Inc., International Preliminary Report on Patentability, PCT/US2014/026687, 7 pgs.
Bergstrom, Inc., International Search Report and Written Opinion, PCT/US2014/026683, dated Jul. 3, 2014 12 pgs.
Bergstrom, Inc., International Preliminary Report on Patentability, PCT/US2014/026683, dated Sep. 15, 2015, 6 pgs.
Bergstrom, Inc., International Search Report and Written Opinion, PCT/US2013/068331, dated Nov. 7, 2014, 9 pgs.
Bergstrom, Inc., International Preliminary Report on Patentability, PCT/US2013/068331, dated May 10, 2016, 6 pgs.
Bergstrom, Inc., International Search Report and Written Opinion, PCT/US2016/021602, dated Nov. 3, 2016, 7 pgs.
Bergstrom, Inc., International Preliminary Report on Patentability, PCT/US2016/021602, dated Sep. 12, 2017, 11 pgs.
Bergstrom, Inc., International Search Report and Written Opinion, PCT/US2017/021346, dated Jul. 25, 2017, 11 pgs.
Bergstrom, Inc., International Search Report and Written Opinion, PCT/US2016/065812, dated Mar. 22, 2017, 12 pgs.
Bergstrom, Inc., International Preliminary Report on Patentability, PCT/US2016/065812, dated Jun. 12, 2018, 8 pgs.
Bergstrom, Inc., International Search Report and Written Opinion, PCT/US2018/044093, dated Oct. 25, 2018, 13 pgs.
Bergstrom, Inc., International Search Report and Written Opinion, PCT/US2017049859, dated Nov. 12, 2017, 4 pgs.
Bergstrom, Inc., International Preliminary Report on Patentability, PCT/US2017049859, dated Mar. 5, 2019, 6 pgs.
Bergstrom, Inc., International Search Report and Written Opinion PCT/US2017053196, dated Sep. 3, 2018, 17 pgs.
Bergstrom, Inc., International Preliminary Report on Patentability, PCT/US2017053196, dated Apr. 2, 2019, 11 pgs.
Bergstrom, Inc., International Search Report and Written Opinion PCT/US2016/423326, dated Sep. 27, 2016, 8 pgs.
Bergstrom, Inc., International Preliminary Report on Patentability PCT/US2016/423326, dated Jan. 16, 2018, 7 pgs.
Bergstrom, Inc., International Search Report and Written Opinion PCT/US2016/42307, dated Oct. 7, 2016, 8 pgs.
Bergstrom, Inc., International Preliminary Report on Patentability PCT/US2016/42307, dated Jan. 16, 2018, 7 pgs.
Bergstrom, Inc., International Search Report and Written Opinion PCT/US2016/42314, dated Sep. 30, 2016, 7 pgs.
Bergstrom, Inc., International Preliminary Report on Patentability, PCT/US2016/42314, dated Jan. 16, 2018, 6 pgs.
Bergstrom, Inc., International Search Report and Written Opinion PCT/US2016/42329, dated Sep. 30, 2016, 6 pgs.
Bergstrom, Inc., International Preliminary Report on Patentability PCT/US2016/42329, dated Jan. 16, 2018, 5 pgs.
Bergstrom, Inc., Communication Pursuant to Rules 161(2) and 162 EPC, EP14717604.4, dated Oct. 23, 2015, 2 pgs.
Bergstrom, Inc., Communication Pursuant to Article 94(3), EP14717604.4, dated Jun. 2, 2017, 12 pgs.
Bergstrom, Inc., Communication Pursuant to Article 94(3), EP14717604.4, dated Feb. 4, 2019, 5 pgs.
Bergstrom, Inc., Communication Pursuant to Rules 161(2) and 162 EPC, EP14722438.0, dated Nov. 2, 2015. 2 pgs.
Bergstrom, Inc. Communication Pursuant to Article 94(3), EP14722438.0, dated Jan. 24, 2018, 5 pgs.
Bergstrom, Inc., Communication Pursuant to Rules 161(2) and 162 EPC, EP13795064.8, dated Jun. 22, 2016, 2 pgs.
Bergstrom, Inc. Extended European Search Report, EP16204254.3, dated Jul. 25, 2017, 8 pgs.
Bergstrom, Inc. Partial European Search Report, EP16204259.2, dated May 30, 2017, 14 pgs.
Bergstrom, Inc. Extended European Search Report, EP16204259.2, dated Oct. 25, 2017, 15 pgs.
Bergstrom, Inc. Corrected Extended European Search Report, EP16204259.2, dated Nov. 24, 2017, 15 pgs.
Bergstrom, Inc. Partial European Search Report, EP16204256.8, dated Jul. 13, 2017, 14 pgs.
Bergstrom, Inc. Extended European Search Report, EP16204256.8, dated Jan. 12, 2018, 11 pgs.
Bergstrom, Inc. Extended European Search Report, EP16204256.8, dated Dec. 1, 2017, 13 pgs.
Bergstrom, Inc. Extended European Search Report, EP16204267.5, dated Jul. 11, 2017, 8 pgs.
Bergstrom, Inc., Communicaton Pursuant to Article 94(3), EP16820096.2, dated Aug. 12, 2019, 7 pgs.
Bergstrom, Inc. Extended European Search Report, EP18177850.7, dated Nov. 28, 2018. 8 pgs.
Bergstrom, Inc., Communication Pursuant to Rules 161(1) and 162, EP17780954.8, dated May 10, 2019, 3 pgs.
Bergstrom, Inc., Extended European Search Report, EP19166779.9, dated Aug. 30, 2019, 8 pgs.
Bergstrom, Inc., Office Action, CN201480027137.4, dated Mar. 3, 2017, 15 pgs.
Bergstrom, Inc., 2nd Office Action, CN201480027137.4, dated Jul. 13, 2017, 10 pgs.
Bergstrom, Inc., 3rd Office Action, CN201480027137.4, dated Jan. 17, 2018, 19 pgs.
Bergstrom, Inc., 4th Office Action, CN201480027137.4, dated Jul. 26, 2018, 8 pgs.
Bergstrom, Inc., Notification of Grant, CN201480027137.4, dated Feb. 21, 2019, 1 pg.
Bergstrom, Inc., Patent Certificate CN201480027137.4, dated May 31, 2019, 4 pgs.
Bergstrom, Inc., Office Action, CN201480027117.7, dated Mar. 9, 2017, 8 pgs.
Bergstrom, Inc., Patent Certificate, CN201480027117.7, dated Nov. 21, 2017, 3 pgs.
Bergstrom, Inc., 2nd Office Action, CN201380081940.1, dated Jan. 17, 2018, 13 pgs.
Bergstrom, Inc., 3rd Office Action, CN201380081940.1, dated Jul. 30, 2018, 7 pgs.
Bergstrom, Inc., 1st Office Action, CN201680002224.3, dated Dec. 11, 2018, 5 pgs.
Connell, Office Action, U.S. Appl. No. 14/209,877, dated Nov. 27, 2015, 19 pgs.
Connell, Office Action, U.S. Appl. No. 14/209,877, dated Jun. 22, 2016, 17 pgs.
Connell, Final Office Action, U.S. Appl. No. 14/209,877, dated Dec. 29, 2016, 21 pgs.

(56) References Cited

OTHER PUBLICATIONS

Connell, Notice of Allowance, U.S. Appl. No. 14/209,877, dated May 16, 2017, 5 pgs.
Connell, Notice of Allowance, U.S. Appl. No. 14/209,877, dated Aug. 4, 2017, 7 pgs.
Connell, Office Action, U.S. Appl. No. 14/209,961, dated Dec. 2, 2015, 14 pgs.
Connell, Final Office Action, U.S. Appl. No. 14/209,961, dated Jul. 25, 2016, 15 pgs.
Connell, Notice of Allowance, U.S. Appl. No. 14/209,961, dated Jun. 15, 2017, 10 pgs.
Connell, Notice of Allowance, U.S. Appl. No. 15/064,552, dated Jun. 1, 2017, 9 pgs.
Connell, Notice of Allowance, U.S. Appl. No. 14/995,119, dated Aug. 31, 2017, 7 pgs.
Connell, Office Action, U.S. Appl. No. 14/965,142, dated Aug. 29, 2017, 12 pgs.
Connell, Notice of Allowance, U.S. Appl. No. 14/965,142, dated Feb. 26, 2018, 8 pgs.
Connell, Office Action, U.S. Appl. No. 15/280,876, dated Dec. 14, 2017, 23 pgs.
Connell, Notice of Allowance, U.S. Appl. No. 15/280,876, dated Jun. 21, 2018, 8 pgs.
Connell, Office Action, U.S. Appl. No. 15/791,243, dated May 8, 2018, 12 pgs.
Connell, Office Action, U.S. Appl. No. 15/065,745, dated May 31, 2018, 44 pgs.
Connell, Final Office Action, U.S. Appl. No. 15/065,745, dated Dec. 17, 2018, 27 pgs.
Connell, Office Action, U.S. Appl. No. 15/065,745, dated May 9, 2019, 28 pgs.
Connell, Office Action, U.S. Appl. No. 15/283,150, dated Sep. 27, 2018, 21pgs.
Connell, Notice of Allowance, U.S. Appl. No. 15/283,150, dated Mar. 22, 2019, 8 pgs.
Connell, Office Action, dated Oct. 19, 2018, U.S. Appl. No. 15/722,860, 7 pgs.
Connell, Notice of Allowance, dated Feb. 7, 2019, U.S. Appl. No. 15/722,860, 5 pgs.
Connell, Notice of Allowance, dated May 20, 2019, U.S. Appl. No. 15/722,860, 5 pgs.
Connell, Notice of Allowance, U.S. Appl. No. 15/791,243, dated Jan. 24, 2019, 7 pgs.
Connell, Notice of Allowance, U.S. Appl. No. 15/791,243, dated May 15, 2019, 7 pgs.
Connell, Office Action, dated Apr. 18, 2019, U.S. Appl. No. 15/816,993, 17 pgs.
FlatPlate Heat Exchangers; GEA FlatPiate Inc.; website—http://www.flatplate.com/profile.html; date last visited Aug. 9, 2007; 3 pages.
Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.
Glacier Bay Inc., Darpa/Glacier Bay ECS, pages printed from a website, httir//web.archive.org/web/19991104132941/wvvw .glacierbay.com/darQatxt. htm, apparent archive date: Nov. 4, 1999, 2 pages.
Giacier Bay Inc., Glacier Bay ECS DARPA Project—Final Report, pages printed from a website, httn://web.archive.or_gjweb/19991103001512/v•vww ,_g.Jacierbay.com/Damhtm.htm, apparent archive date: Nov. 3, 1999, 9 pages.
Glacier Bay Inc., Glacier Bay ECS DARPA Project—Project Photos, pages printed from a website, httg://web.archive.org/web/1999"1103012854/www .glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.orq/web/19991022221040/wvvw .qlacierbay.com/DarQvid.htm, apparent archive date Oct. 22, 1999; 1 page.
Glacier Bay Inc., R & D, pages printed from a website, htt ://web.archive.org/web/20000121130306/www.glacierbay.com/R&D.htm, apparent archive date: Jan. 21, 2000, 2 pages.
Glacier Bay Inc., Company History, pages printed from a website, httg://web.archive.org/web/20000301153828/www .g!acierbay.com/History:.htm, apparent archive date: Mar. 1, 2000; 2 pages.
Glacier Bay Inc., Contact, page printed from a website, httQ://web.archive.orq/web/19990508104511/W\'"I!V .glacierba:t.com/Contact.htm, apparent archive date: May 8, 1999; 1 page.
Hansson, Office Action dated Oct. 5, 2018, U.S. Appl. No. 15/256,109, 14pgs.
Hansson, Final Office Action, U.S. Appl. No. 15/256,109, dated May 2, 2019, 14 pgs.
Michael Löhle, Günther Feuerecker and Ulrich Salzer; NON Idling HVAC-modufe tor Long Distance Trucks;SAE TechnicalPaper Series 1999-01-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Mayo Mayo, Office Action, U.S. Appl. No. 15/034,517, dated Feb. 21, 2018, 22 pgs.
Mayo Mayo, Final Office Action, U.S. Appl. No. 15/034,517, dated Aug. 28, 2018, 9pgs.
Mayo Mayo, Final Office Action, U.S. Appl. No. 15/034,517, dated Nov. 30, 2018, 7 pgs.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 205, 1 page.
TropiCool Power Plus, More comfort. More efficiency. More options.; ACC Climate Control Brochure, Elkhart, Indiana; 2006, 3 pages.
TYCO Electronics Corporation, "MAG-MATE Connector with Multispring Pin," Datasheet, 2013, pp. 1-2 from <URL: http://datasheet.octopart.com/1247003-2-TE-Connectivity-datasheet-14918754.pdf<.
Packless Industries, the leader in refrigerant to water coaxial heat exchangers, flexible hoses and sucti . . . ; website—http://www.packless.com/profile.htmle: date last visited Aug. 9, 2007; 1 page.
Zeigler, Office Action, U.S. Appl. No. 13/661,519, dated Mar. 11, 2013, 8 pgs.
Zeigler, Final Office Action, U.S. Appl. No. 13/661,519, dated Sep. 18, 2013, 15 pgs.
Zeigler, Office Action, U.S. Appl. No. 13/661,519, dated Apr. 9, 2014, 20 pgs.
Zeigler, Office Action, U.S. Appl. No. 13/661,519, dated Sep. 26, 2014, 23 pgs.
Zeigler, Office Action, U.S. Appl. No. 13/661,519, dated Oct. 28, 2015, 20 pgs.
Zeigler, Notice of Allowance, U.S. Appl. No. 13/661,519, dated Jun. 17, 2016, 8 pgs.

* cited by examiner

SYSTEMS AND METHODS FOR STARTING-UP A VEHICULAR AIR-CONDITIONING SYSTEM

TECHNICAL FIELD

This relates generally to vehicular air-conditioning systems, including but not limited to, component failure detection in vehicular air-conditioning systems.

BACKGROUND

Recent global economic expansion has stressed the transportation industry's ability to keep up with shipping demands for materials and products. Drivers' time spent on the road, and in the vehicles, has increased in an attempt to meet the high market demands. In addition, drivers in the industry take breaks along their routes to combat fatigue or to comply with various regulations. Thus, the number of trucks pulled over at toll plazas, weight stations, rest stops, and the like has also increased in recent years. Significantly, these locations often do not provide facilities for the drivers to use to sleep or rest, necessitating continued occupancy within the vehicle.

In some circumstances heat conditions can present issues for the drivers ranging from discomfort to health risks, such as heat stroke. Thus it is important that the drivers have access to functioning vehicular air-conditioning systems at all times, including at rest stops.

Suitable battery driven air-conditioning systems include a number of electrically driven components, that are typically all energized at once when the air-conditioning system is turned on. This however, may lead to component failure.

SUMMARY

Accordingly, there is a need for systems and/or devices with more efficient and accurate methods for detecting component failure in vehicle air-conditioning systems. In some instances, such systems, devices, and methods prevent catastrophic failure of the vehicular air-conditioning system, resulting in decreased repair times and/or costs. Such systems, devices, and methods optionally complement or replace conventional systems, devices, and methods for detecting component failure.

(A1) Some implementations include a method performed at a vehicle air-conditioning system including a blower fan, a condenser fan, and a compressor, all of which are electrically coupled to a battery system. The method includes: (1) while the condenser fan and compressor are off, starting the blower fan; (2) after starting the blower fan, measuring a first current drawn from the battery system, where the first current is indicative of current drawn by the blower fan; (3) in accordance with a determination that the first current meets one or more predefined criteria, starting the condenser fan while leaving the compressor off; (4) after starting the condenser fan, measuring a second current drawn from the battery system, where the difference between the second current and the first current is indicative of current drawn by the condenser fan; and (5) in accordance with a determination that the second current meets one or more predefined second criteria, starting the compressor.

(A2) In the implementations above, the method further comprises: (1) after starting the compressor, measuring a third current drawn from the battery system, where the difference between the third current and the second current is indicative of current drawn by the compressor; and (2) in accordance with a determination that the third current does not meet one or more predefined third criteria, generating an error condition.

(A3) In the implementations above, measuring the first current drawn from the battery system comprises measuring the first current drawn from the battery system in accordance with a determination that a predetermined amount of time has elapsed since starting the blower fan.

(A4) In the implementations above, the method further comprises, in accordance with a determination that the first current does not meet the one or more predefined criteria, generating an error condition.

(A5) In some implementations of the method of A2 and/or A4, generating the error condition comprises one or more of: (1) disabling the vehicle air-conditioning system; (2) alerting a user of the vehicle air-conditioning system of the error condition; and (3) initiating a repair procedure.

(A6) In some implementations above, the one or more predefined criteria comprise a criterion that the first current is between an upper current threshold and a lower current threshold.

(A7) In some implementations above: (1) the vehicle air-conditioning system further includes a current sensor, (2) measuring the first current comprises measuring the first current at the current sensor, and (3) measuring the second current comprises measuring the second current at the current sensor.

(A8) In some implementations above, starting the blower fan comprises ramping up power provided to the blower fan over a predetermined amount of time.

(A9) In some implementations v, starting the blower fan comprises starting the blower fan in response to one of: (1) a signal received from a thermostat; and (2) a command received from a user of the vehicle air-conditioning system.

(A10) In some implementations above, starting the blower fan comprises starting the blower fan in accordance with a determination that the vehicle air-conditioning system is in a particular operating state.

(A11) In some implementations above, measuring the first current comprises monitoring the first current for a particular time interval.

In another aspect, some implementations include a computing system including one or more processors and memory coupled to the one or more processors, the memory storing one or more programs configured to be executed by the one or more processors, the one or more programs including instructions for performing any of the methods described herein (e.g., methods A1-A11 above).

In yet another aspect, some implementations include a vehicle air-conditioning system including a blower fan, a condenser fan, a compressor, and a battery system electrically coupled to the blower fan, condenser fan, and the compressor; the battery system configured to perform any of the methods described herein (e.g., methods A1-A11 above).

In yet another aspect, some implementations include a computing device including one or more processors and memory coupled to the one or more processors, the memory storing one or more programs configured to be executed by the one or more processors, the one or more programs including instructions for performing any of the methods described herein (e.g., methods A1-A11 above).

In yet another aspect, some implementations include a non-transitory computer-readable storage medium storing one or more programs for execution by one or more processors of a vehicle air-conditioning system, the one or more programs including instructions for performing any of the methods described herein (e.g., methods A1-A11 above).

Thus, devices, storage mediums, and systems are provided with methods for starting-up a vehicle air-conditioning system, thereby increasing the effectiveness, efficiency, and user satisfaction with such systems. Such methods may complement or replace conventional methods for starting-up a vehicle air-conditioning system.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1:
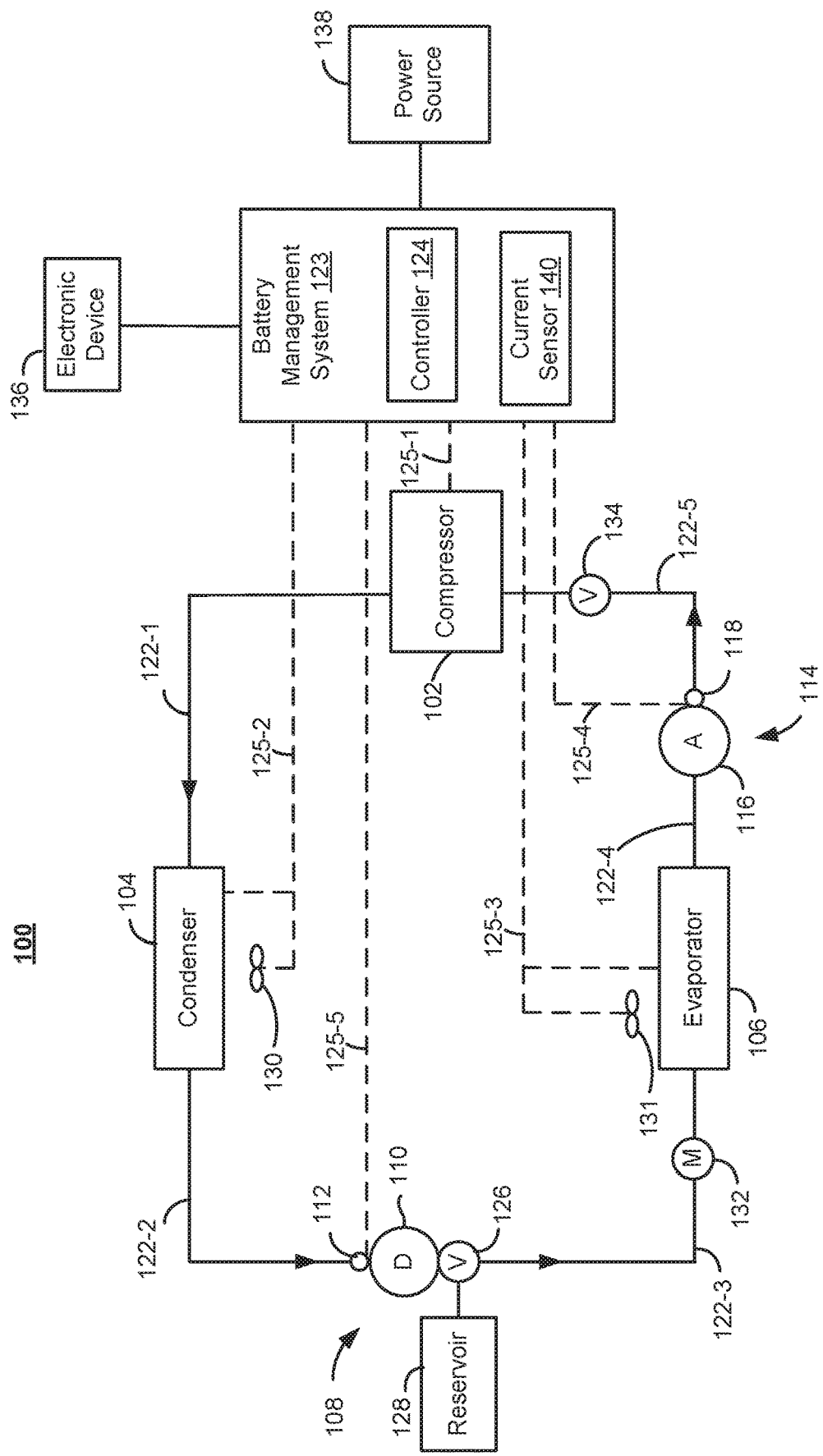
FIG. 1 is a block diagram illustrating an air-conditioning system in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Implementations of the present disclosure are described in the context of air-conditioning systems for use in vehicles, and in particular, in the context of air-conditioning systems to cool different compartments or spaces of an over-the-road or off-road vehicle. In some implementations, the air-conditioning system comprises, or is a component of, a heating, ventilation, and air-conditioning (HVAC) system.

It is to be appreciated that the term vehicle as used herein may refer to trucks, such as tractor-trailer trucks or semi-trailer trucks, the scope of the present teachings is not so limited. The present teachings are also applicable, without limitation, to cars, vans, buses, trailers, boats, planes, and any other suitable vehicle.

In some implementations, the air-conditioning system includes at least one compressor, at least one condenser, at least one evaporator, refrigerant lines, and a battery system. In some implementations, the refrigerant lines fluidly connect the compressor, condenser and evaporators to form a refrigerant circuit. In some implementations, a condenser includes at least one condenser fan. In some implementations, an evaporator includes at least one evaporator fan (also sometimes called a blower fan).

In some implementations, the air-conditioning system includes at least one user interface (e.g., touch screen) and at least one sensor (e.g., a thermostat). In some implementations, the battery system includes at least one battery or power source and a battery monitoring system (also sometimes called a battery management system). In some implementations, the battery monitoring system includes at least one current sensor. In some implementations, the battery monitoring system includes a controller, such as an automatic temperature controller. In some implementations, the controller is electrically coupled to other components of the air-conditioning system (e.g., a compressor, a condenser, etc.) to control operation of these components.

FIG. 1 is a block diagram illustrating an air-conditioning system 100 (sometimes also called a refrigeration system) in accordance with some implementations. FIG. 1 shows the refrigeration system 100 including a compressor 102, a condenser 104, an evaporator 106, and refrigerant lines 122 fluidly connecting the compressor 102, condenser 104, and evaporator 106 to form a refrigerant circuit for circulating a refrigerant. In accordance with some implementations, the refrigerant circuit shown in FIG. 1 includes a receiver drier unit 108 and an accumulator unit 114. In some implementations, the refrigerant circuit includes only one of the receiver drier unit 108 and the accumulator unit 114.

In FIG. 1, the condenser 104 is disposed downstream of the compressor 102 and fluidly connected to the compressor 102 by a refrigerant line 122-1. The receiver drier unit 108 is disposed downstream of the condenser 104 and fluidly connected to the condenser 104 by a refrigerant line 122-2. In accordance with some implementations, the receiver drier unit 108 includes a receiver drier 110 and a first sensor 112. The evaporator 106 is disposed downstream of the receiver drier unit 108 and fluidly connected to the receiver drier unit 108 by a refrigerant line 122-3. The accumulator unit 114 is disposed downstream of the evaporator 106 and fluidly connected to the evaporator 106 by a refrigerant line 122-4 and to the compressor 102 by a refrigerant line 122-5, thus forming a refrigerant circuit for circulating the refrigerant. In some cases, the accumulator unit 114 includes an accumulator 116 and a second sensor 118. As used herein, the term "downstream" refers to a position along a refrigerant line in the direction of the refrigerant flow. As used herein, the term "upstream" refers to a position along a refrigerant line opposite to the direction of the refrigerant flow.

In some implementations, the first sensor 112 and the second sensor 118 are optionally any type of sensor suitable to measure temperature and/or pressure of the refrigerant, including but not limited to combined pressure and temperature transducers. In some implementations, the first sensor 112 includes a first temperature sensor and a first pressure sensor; and the second sensor 118 includes a second temperature sensor and a second pressure sensor. In some implementations, the first sensor 112 is disposed on the high pressure side of the refrigerant circuit, and optionally installed at the receiver drier 110 such as at the inlet, outlet, interior or other suitable location of the receiver drier 110. In some implementations, the second sensor 118 is disposed on the low pressure side of the refrigerant circuit, and optionally installed at the accumulator 116 such as at the inlet, outlet, interior or other suitable location of the accumulator 116. Having the first sensor 112 installed at the receiver drier 110 and/or the second sensor 118 at the accumulator 116 provides several advantages, including packaging and installation convenience, original equipment time saving, and easier leakage testing.

In some implementations, during operation of the air-conditioning system, the compressor 102 compresses a refrigerant into a compressed refrigerant. The compressor 102 is optionally any type of compressor including but not limited to a reciprocating compressor or rotary compressor. The condenser 104 condenses the refrigerant that has been compressed by the compressor 102. In some implementations, the receiver drier 110 of the receiver drier unit 108 temporarily stores the refrigerant and/or absorbs moisture, debris or other undesirable substances from the refrigerant that has been condensed by the condenser 104. In some implementations, the first sensor 112 measures temperature and pressure of the refrigerant that has been condensed by the condenser 104. The evaporator 106 vaporizes or evaporates the refrigerant that has been condensed by the condenser 104, providing cooling for desired use. In some implementations, the accumulator 116 restricts liquid refrigerant from entering the compressor 102, for example by temporarily storing excess liquid refrigerant at the accumulator 116, to prevent damage to the compressor 102. In some implementations, the second sensor 118 measures temperature and pressure of the refrigerant that has been vaporized/evaporated by the evaporator 106. It should be noted that depending on the operation and performance of the air-conditioning system, the condensed refrigerant at the receiver drier 110 and the vaporized/evaporated refrigerant at the accumulator 116 is in the form of a liquid, a vapor, or a mixture of liquid and vapor.

The air-conditioning system 100 also includes a power source 138 for powering one or more components of the system, such as condenser 104, evaporator 106, compressor 102, and the like. In some implementations, the power source 138 comprises a solar cell, an electrical battery, an alternator, or the like. In some implementations, the power source 138 is belt driven from an internal combustion engine of a vehicle. In some implementations, the air-conditioning system 100 includes a battery management system 123 for managing various components of the system, such as power source 138. In some implementations, the battery management system 123 governs an amount of power drawn by each component of the air-conditioning system 100.

In some implementations, the battery management system 123 includes one or more controllers 124 and one or more current sensors 140. In some implementations, the controller 124 is electrically coupled to one or more components of the air-conditioning system, such as condenser 104 (e.g., via connection 125-2), evaporator 106 (e.g., via connection 125-3), and/or compressor 102 (e.g., via connection 125-1). In some implementations, the controller 124 is electrically coupled to a condenser fan 130 and an evaporator fan 131. In some implementations, the controller 124 is configured to monitor and control the amount of the power drawn by the evaporator 106, the amount of power drawn by the compressor 102, the refrigerant level in the refrigeration system, and/or other operations. For example, in FIG. 1, the controller 124 is electrically coupled via connection 125-4 to the first sensor 112 of the receiver drier unit 108 and coupled via connection 125-5 to the second sensor 118 of the accumulator unit 114. In some implementations, controller 124 includes memory, such as volatile memory or non-volatile memory. In some implementations, controller 124 includes one or more processors.

As used herein, "refrigerant charge level" refers to an amount of refrigerant contained in the refrigeration system, and "predetermined refrigerant charge level" refers to a predetermined amount of refrigerant for the refrigeration system to operate efficiently and safely. In most cases, the predetermined refrigerant charge level depends on the design and configuration of the refrigeration system and can be determined prior to the use of the refrigeration system. Maintaining the refrigerant at or above the predetermined refrigerant charge level during the operation of refrigeration system is essential for the refrigeration system to operate efficiently and safely.

In some implementations, the refrigeration system further includes an electronic valve 126 to inject refrigerant from a refrigerant reservoir 128 into the refrigeration system when the refrigerant charge level is below a predetermined refrigerant charge level. In some implementations, control of the electronic valve is controlled by the controller 124. As an example, FIG. 1 illustrates the electronic valve 126 installed at the receiver drier 110. In some implementations, the electronic valve 126 is selectively operated to allow flow of the refrigerant from the refrigerant reservoir 128 to the refrigerant circuit.

In some implementations, the battery management system 123 and/or the controller 124 is configured to calculate a compression ratio of the compressor 102. If the calculated compression ratio exceeds a specific compression ratio for a given condition, the battery management system 123 determines that a blockage has occurred in the refrigerant circuit. In some implementations, the battery management system 123 then examines various factors to determine a location of the blockage. For example, an abnormal sub-cooling level indicates a blockage in the condenser 104 and an abnormal super-cooling indicates a blockage in the evaporator 106.

In some implementations, the battery management system 123 and/or the controller 124 is configured to manage start-up of the air-conditioning system and detect any component failure during the start-up process. In some implementations, the controller 124 operates in conjunction with current sensor 140 to detect component failures. In some implementations, current sensor 140 is utilized to measure and/or monitor the current drawn from the power source 138 (e.g., current drawn by the condenser 104, the evaporator 106, and/or the compressor 102). In some implementations, the battery management system 123 governs operation of the air-conditioning system based on the measurements by the current sensor 140.

In some implementations, the battery management system 123 is communicatively coupled to an electronic device 136 and/or a server system (not shown). In some implementations, the electronic device comprises a display, a user interface, a smartphone, and/or a computer. In some implementations, the electronic device 136 is located in proximity with the air-conditioning system. For example, the air-conditioning system is installed in a vehicle and the electronic device 136 is a display on the dashboard of the vehicle. In some implementations, the electronic device 136 is located remotely from the air-conditioning system. For example, the air-conditioning system is installed in a vehicle and the electronic device 136) is a device not connected with the vehicle, such as a smartphone or a computer at a dealer. The battery management system 123 outputs one or more signals to the electronic device 136. In some implementations, the signals optionally include data (e.g., the current drawn by a particular component, the refrigerant charge level, and the like), alerts (e.g., excessive current drawn by a particular component), maintenance request, and the like.

In some implementations, the air-conditioning system includes one or more additional components such as air blowers, metering devices, flow control valves, and the like. In accordance with some implementations, FIG. 1 illustrates the air-conditioning system including a condenser blower 130 electrically coupled to the battery management system 123 and positioned proximate the condenser 104. In some implementations, the condenser blower 130 comprises one or more fans. In some implementations, the condenser blower 130 is a component of the condenser 104. In some implementations, the condenser blower 130 is configured to blow ambient air and/or air from an air intake of the engine over the condenser 104. The amount of airflow over the condenser 104 affects the temperature and pressure of the refrigerant at the high pressure side of the refrigerant circuit and hence the efficiency of the air-conditioning system. Accordingly, in some implementations, to enhance the efficiency of the air-conditioning system, the battery management system 123 controls a speed of the condenser blower 130 based at least in part on the temperature measured by the first sensor 112, the pressure measured by the first sensor 112, the temperature measured by the second sensor 118, the pressure measured by the second sensor 118, and/or the current measured by current sensor 140.

In accordance with some implementations, FIG. 1 illustrates the air-conditioning system including an evaporator blower 131 electrically coupled to the battery management system 123 and positioned proximate the evaporator 106. In some implementations, the evaporator blower 131 comprises one or more fans. In some implementations, the evaporator blower 131 is a component of the evaporator 106. In some implementations, the evaporator blower 131 is configured to blow past the evaporator 106, thereby cooling the air.

The air-conditioning system as illustrated in FIG. 1 also includes a metering device 132 disposed upstream of the evaporator 106 and configured for controlling flow of the refrigerant into the evaporator 106. In some implementations, the metering device 132 comprises a thermal expansion valve or a capillary tube. In some implementations, the air-conditioning system further includes a flow control valve 134 disposed upstream of the compressor 102 and configured to selectively restrict or permit flow of the refrigerant to the compressor 102.

Figure 2:
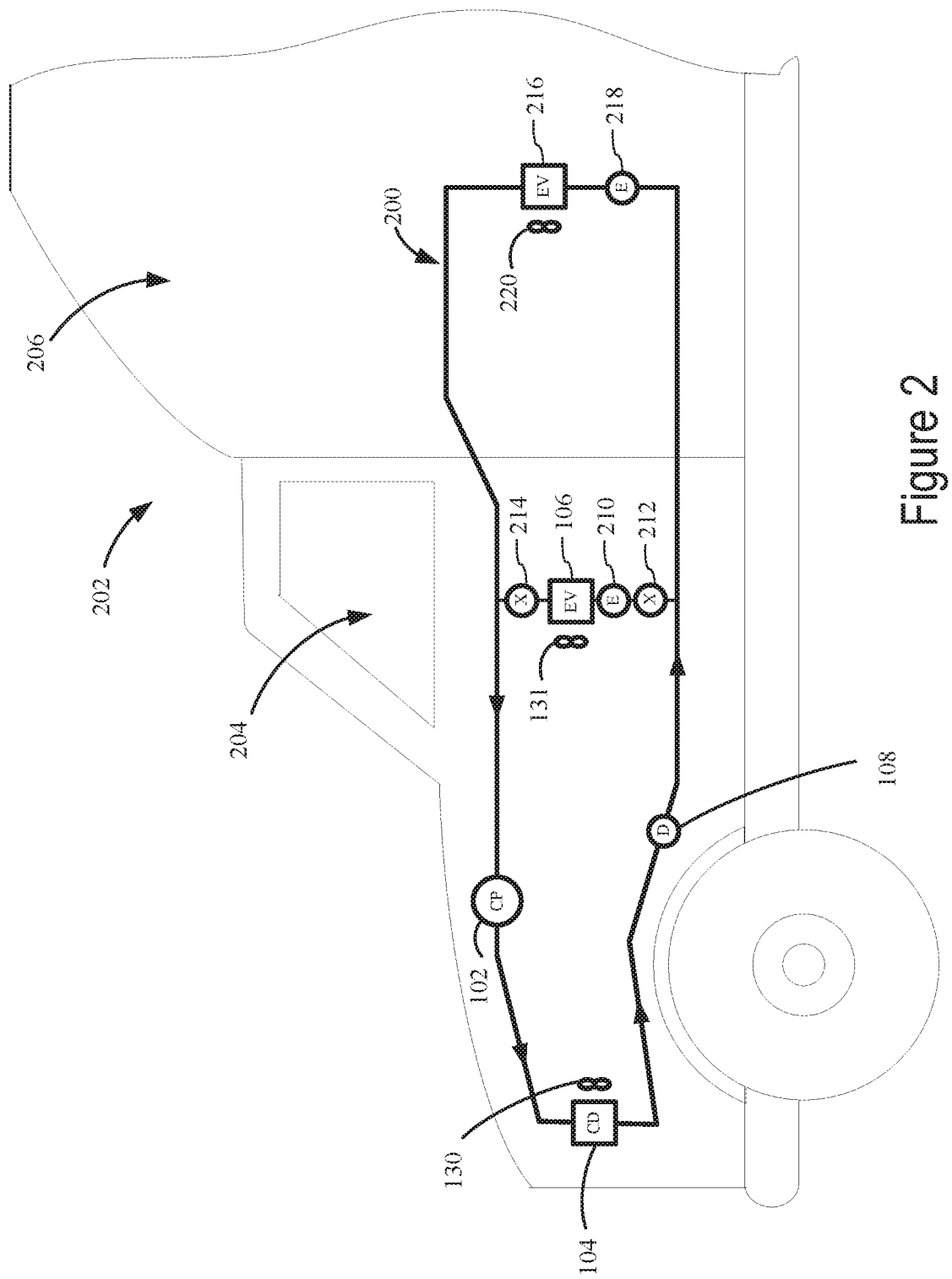
FIG. 2 is a block diagram illustrating an air-conditioning system in a vehicle in accordance with some implementations.

FIG. 2 is a block diagram illustrating an air-conditioning system 200 in a vehicle 202 in accordance with some implementations. The air-conditioning system 200 includes compressor 102, condenser 104 with condenser blower 130, drier unit 108, and a first evaporator (evaporator 106) with evaporator blower 131. The air-condition system 200 also includes a second evaporator 216 with evaporator blower 220, metering devices 210 and 218 (e.g., expansion values), and shut-off values 212 and 214. In some implementations, metering device 210 is configured to control flow rate of the refrigerant into the first evaporator 106 and metering device 218 is configured to control flow rate of the refrigerant into the second evaporator 216.

As shown in FIG. 2, the vehicle 202 has a cab compartment 204 where an operator (e.g., driver) operates the vehicle and a sleeper compartment 206 where the operator can rest. In some implementations, the sleeper compartment 206 is physically partitioned from the cab compartment 204. In some implementations, the first evaporator 106 is in thermal communication with the cab compartment 204, while the second evaporator 216 is in thermal communication with the sleeper compartment 206. In some implementations, the air-conditioning system 200 includes one or more thermal sensors located within the cab compartment 204 to monitor the ambient temperature in the cab compartment; and one or more thermal sensors located in the sleeper compartment 206 to monitor the ambient temperature in the sleeper compartment 206. In some implementations, the air-conditioning system 200 includes a thermostat located within the cab compartment 204 to enable a user to set a desired temperature for the cab compartment 204; and a thermostat located in the sleeper compartment 206 to enable a user to set a desired temperature for the sleeper compartment 206.

In accordance with a determination that cooling is desired in both the cab compartment 204 and the sleeper compartment 206, the first shut-off valve 212 and the second shut-off valve 214 are opened, either manually or automatically, so that the condensed refrigerant flows through both the first and second evaporators and provides cooling to both the cab and sleeper compartments. In accordance with a determination that cooling is only desired in the sleeper compartment (e.g., when the vehicle is parked and no one is in the cab compartment), the first and second shut-off valves are closed. In some implementations, the first and second shut-off valves 212 and 214 are installed at both the refrigerant inlet and outlet of the first evaporator 106; and closing the first and second shut-off valves prevents the refrigerant from entering the first evaporator 106 from both sides and thus prevents the refrigerant from collecting or accumulating in the first evaporator 106. As a result, the condensed refrigerant flows only through the second evaporator 216 and thus enhances the cooling effect of the second evaporator 216. In some implementations, two or more shut-off values (not shown) are used to shut-off flow to the second evaporator 216. In some implementations, shut-off values 212 and 214 are located and configured such that flow is selectively enabled/disabled to both the first evaporator 106 and the second evaporator 216.

Figure 3:
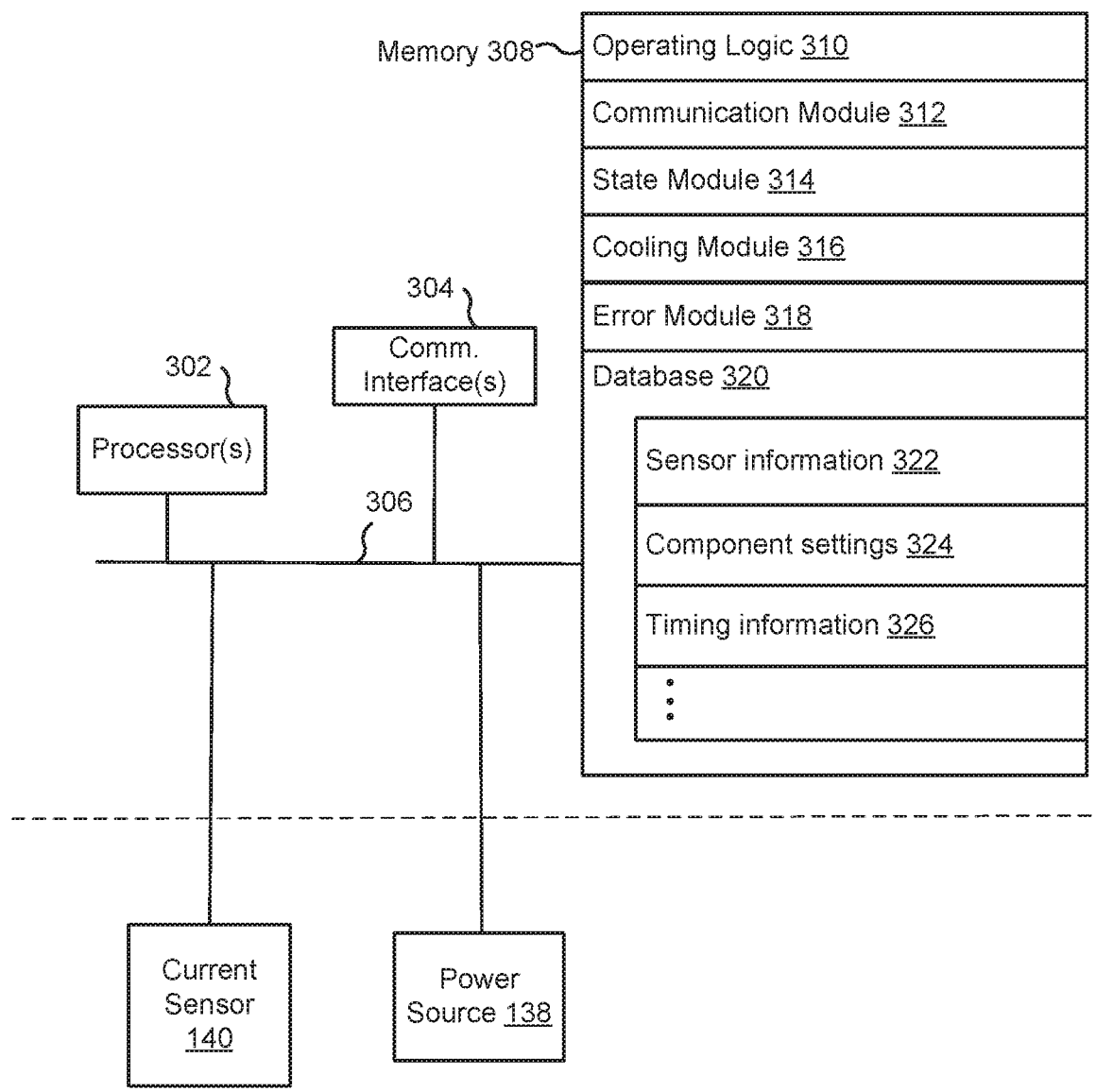
FIG. 3 is a block diagram illustrating a representative controller in accordance with some implementations.

FIG. 3 is a block diagram illustrating a representative controller 124 in accordance with some implementations. In some implementations, the controller 124 includes one or more processing units (e.g., CPUs, ASICs, FPGAs, microprocessors, and the like) 302, one or more communication interfaces 304, memory 308, and one or more communication buses 306 for interconnecting these components (sometimes called a chipset). In some implementations, the controller 124 includes one or more input devices, such as one or more buttons for receiving input. In some implementations, the controller 124 includes one or more output devices, such as one or more indicator lights, a sound card, a speaker, a small display for displaying textual information and error codes, etc. In some implementations, the controller 124 includes a location detection device, such as a GPS (global positioning satellite) or other geo-location receiver, for determining the location of the controller 124. The controller 124 is coupled to the current sensor 140 and the power source 138, as shown in FIG. 1.

Communication interfaces 304 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 308 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 308, or alternatively the non-volatile memory within memory 308, includes a non-transitory computer-readable storage medium. In some implementations, memory 308, or the non-transitory computer readable storage medium of memory 308, stores the following programs, modules, and data structures, or a subset or superset thereof:

Operating logic 310 including procedures for handling various system services and for performing hardware dependent tasks;

Communication module 312 for connecting to and communicating with other network devices connected to one or more networks via the one or more communication interfaces 304 (e.g., wired or wirelessly connected);

State module 314 for determining an operating state of the system (e.g., of air-conditioning system 100, FIG. 1) and/or for setting/adjusting the operating state of the system;

Cooling module 316 for managing cooling operations of the system (e.g., temperature settings, fan speeds, power settings, etc.);

Error module 318 for determining whether one or more error conditions are present and/or conveying the one or more error conditions to a user of the system and/or initiating remedial action in response to the one or more error conditions; and Database 320, including but not limited to:
Sensor information 322 for storing and managing data received, detected, and/or transmitted by one or more sensors of the system (e.g., current sensor 140, sensor 118, and/or sensor 112 in FIG. 1);

Component settings 324 for storing and managing operational settings for one or more components of the system (e.g., condenser 104, compressor 102, and evaporator 106); and Timing information 326 for storing and managing timing information related to operation and/or testing of the system.

Each of the above identified elements (e.g., modules stored in memory 308 of controller 124) corresponds to a set of instructions for performing a function described herein. The above identified modules or programs (i.e., sets of instructions) need not be implemented as separate software programs, procedures, or modules, and thus various subsets of these modules may be combined or otherwise rearranged in various implementations. In some implementations, memory 308, optionally, stores a subset of the modules and data structures identified above. Furthermore, memory 308, optionally, stores additional modules and data structures not described above. For example, memory 308 optionally stores a heating module (not shown) for managing heating operations of the system.

Figure 4A:
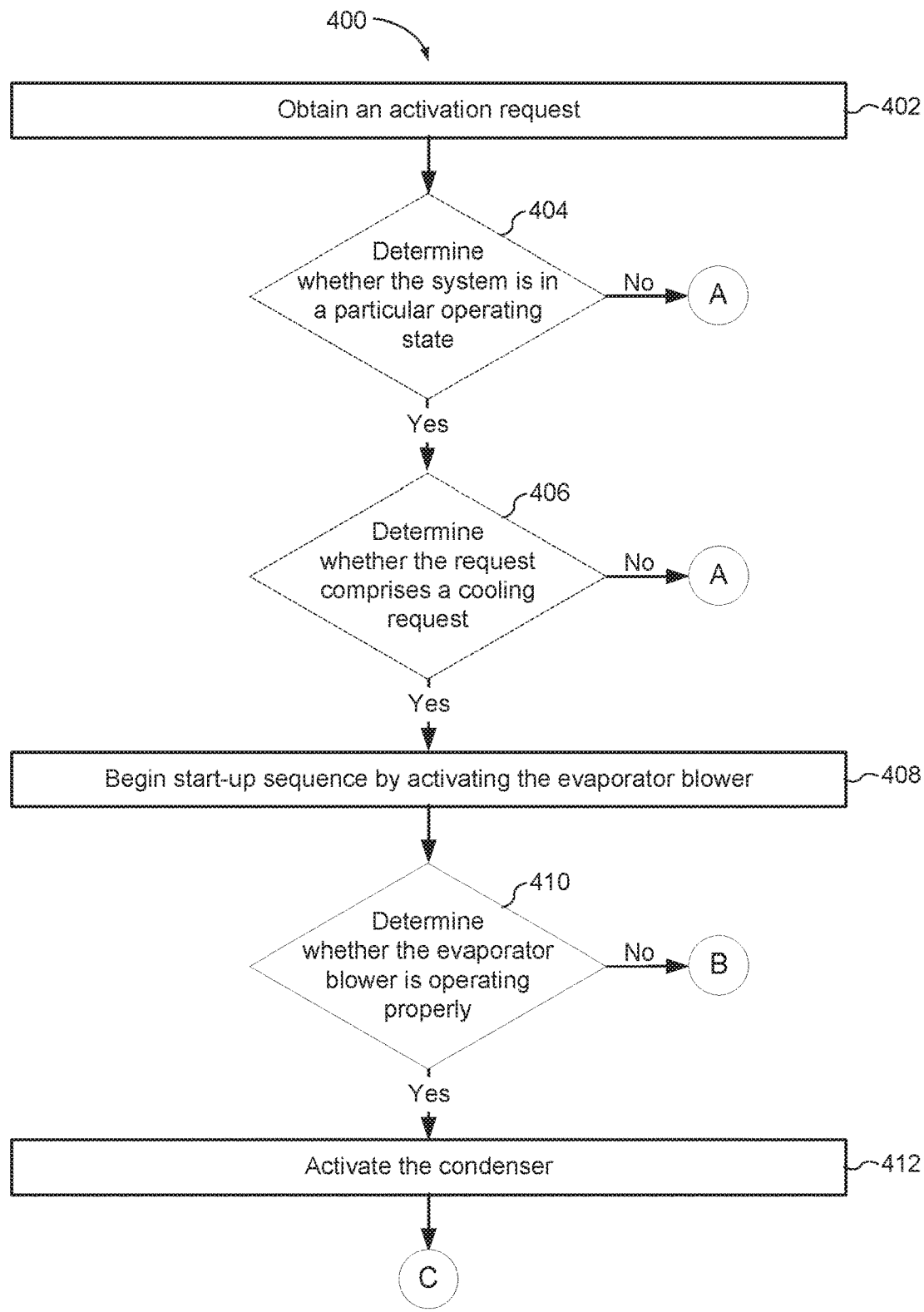
FIGS. 4A-4C illustrate a flowchart representation of a method of starting-up a vehicle air-conditioning system in accordance with some implementations.
Figure 4B:
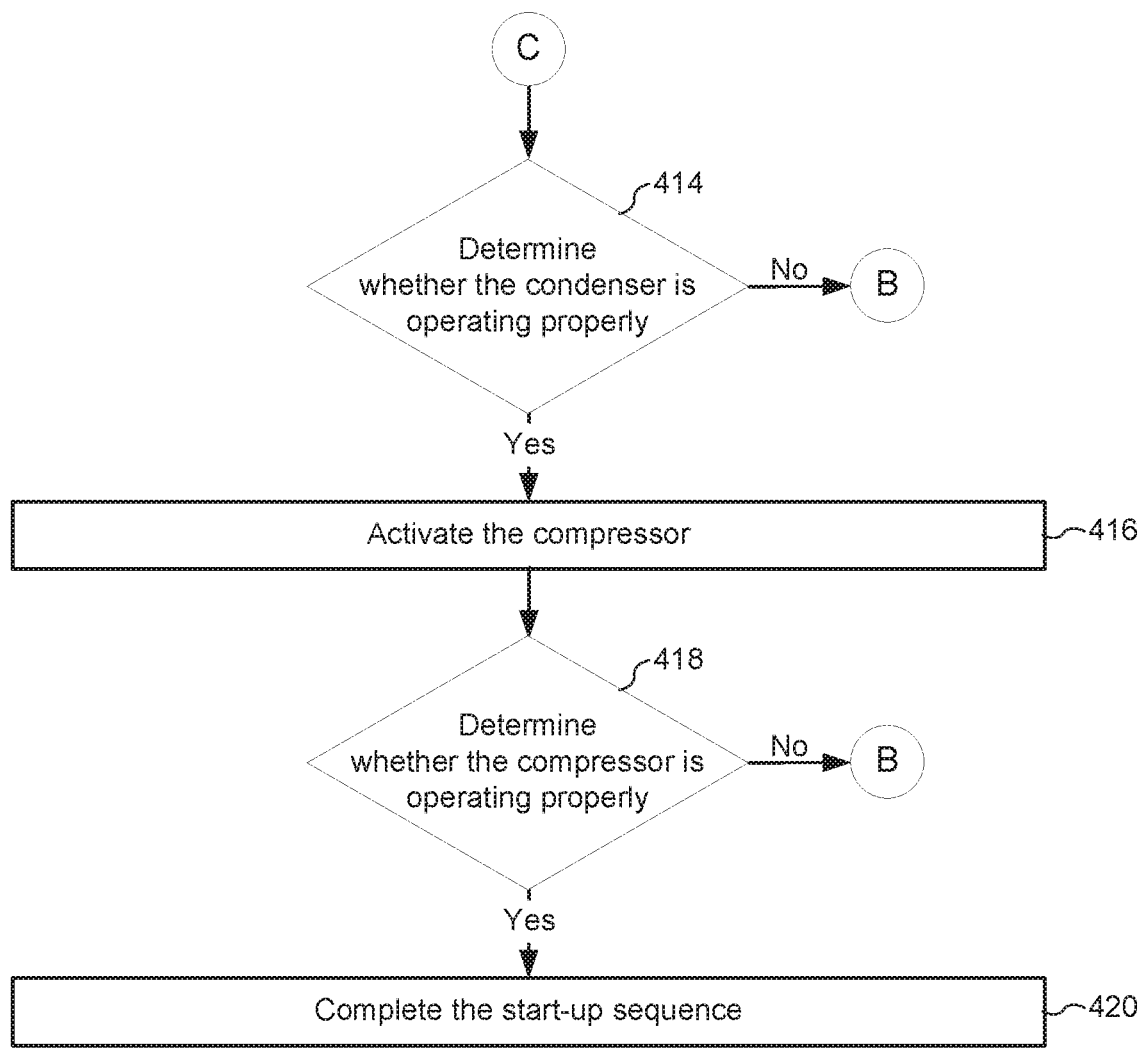
Figure 4C:
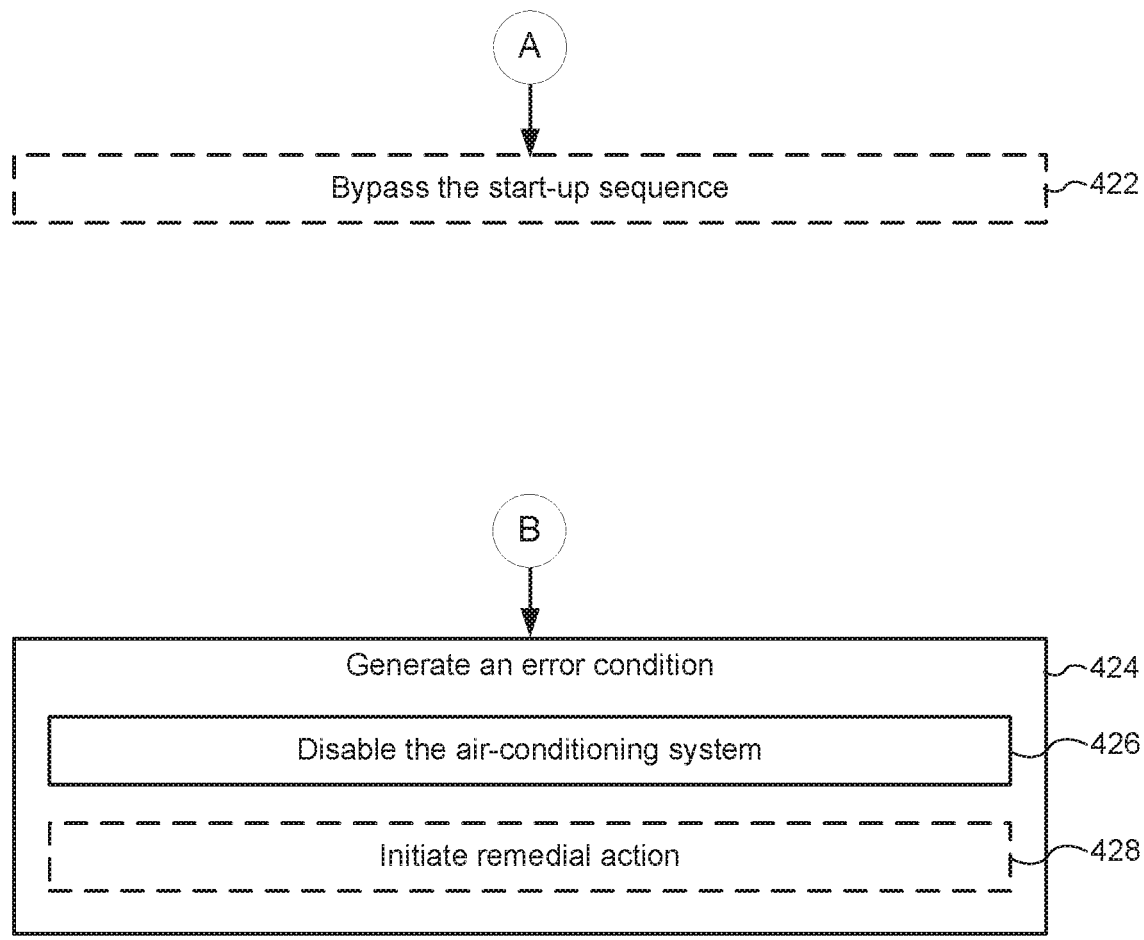

FIGS. 4A-4C illustrate a flowchart representation of a method 400 of starting-up a vehicle air-conditioning system in accordance with some implementations. In some implementations, the method 400 is performed by an air-conditioning system 100 or one or more components of the air-conditioning system, such as battery management system 123, FIG. 1. In some implementations, method 400 is performed by a device or controller (e.g., controller 124, FIG. 1) coupled to the air-conditioning system. Thus, in some implementations, the operations of the method 400 described herein are entirely interchangeable, and respective operations of the method 400 are performed by any of the aforementioned devices, systems, or combination of devices and/or systems. In some implementations, method 400 is governed by instructions that are stored in a non-transitory computer-readable storage medium and that are executed by one or more processors of an air-conditioning system, such as the one or more processors of battery management system 123.

In some implementations, the method 400 is performed as an end-of-the-line diagnostic. For example, the method 400 is performed by an HVAC original equipment manufacturer (OEM) as part of an assembly and/or testing process. In some implementations, the method 400 is performed by a vehicle OEM as part of an assembly and/or testing process. In some implementations, the method 400 is performed during operation of a vehicle in which the system is installed. For example, the method 400 is performed each time a system is activated in a vehicle. For convenience, method 400 is described below as being performed by a system, such as the air-conditioning system 100 in FIG. 1.

The system having an evaporator blower, a condenser, and a compressor obtains (402) an activation request. In some implementations, the evaporator blower is a component of an evaporator of the system. In some implementations, the system receives the activation request from a user of the system. In some implementations, the system obtains the request from a thermostat. In some implementations, the system generates the request based on information from one or more sensors. In some implementations, prior to obtaining the request, the system is in a sleep state. In some implementations, the sleep state comprises a low power state, where no power is provided to the evaporator blower, condenser, or compressor. In some implementation, the system comprises air-conditioning system 100 in FIG. 1. For example, system 100 in FIG. 1 receives an activation request via the battery management system 123 from the electronic device 136. In some implementations, the system comprises air-conditioning system 200 in FIG. 2. In some implementations, the controller 124 obtains the activation request via communication interface(s) 304 in conjunction with communication module 312 (FIG. 3).

In some implementations, the system determines (404) whether the system is in a particular operating state. In some implementations, the particular operating state comprises a state where a battery management system (e.g., the battery management system 123, FIG. 1) is active. In some implementations the particular operating state comprises a state where one or more voltage levels (e.g., voltage levels of power source 138, FIG. 1) meet one or more predetermined criteria. In some implementations, the controller 124 determines whether the system is in the particular operating state (e.g., utilizing state module 314, FIG. 3). In some implementations, determining whether the system is in the particular operating state comprises determining whether the battery management system is active (e.g., is powered on) and/or determining whether the battery management system is communicatively coupled to a communication bus of the vehicle.

In some implementations, in accordance with a determination that the system is in the particular operating state, the system determines (406) whether the activation request comprises a cooling request. For example, in accordance with a determination that the battery management system is active and communicatively coupled to a communication bus of the vehicle, the system determines whether the activation request comprises a cooling request. In some implementations, an activation request comprises one of: a cooling request, a heating request, and a fan request. In some implementations, the system determines whether the activation request comprises a request other than a heating request. In some implementations, the controller 124 determines whether the activation request comprises a cooling request (e.g., utilizing communication module 312, FIG. 3). In some implementations, determining whether the activation request comprises a cooling request includes determining an origin of the activation request.

The system begins (408) a start-up sequence by activating the evaporator blower. In some implementations, the system begins the start-up sequence by activating the evaporator blower in accordance with a determination that the activation request comprises the cooling request. In some implementations, the system begins the start-up sequence by activating the evaporator blower in accordance with a determination that the activation request does not comprise a heating request. In some implementations, activating the evaporator blower comprises supplying power to the evaporator blower. In some implementations, activating the evaporator blower comprises setting a rotational speed for the evaporator blower. In some implementations, the controller 124 activates the evaporator blower (e.g., utilizing cooling module 316 and/or state module 314, FIG. 3). In some implementations, activating the evaporator blower comprises ramping up the power supplied to the evaporator blower (e.g., from power source 138, FIG. 1) over a predetermined amount of time (e.g., $T_{BlwrInit}$, FIG. 5). In some implementations, activating the evaporator blower comprises commanding the blower to the requested speed and then waiting for $T_{BlwrInit}$ seconds (FIG. 5) for the blower to initialize.

Figure 5:
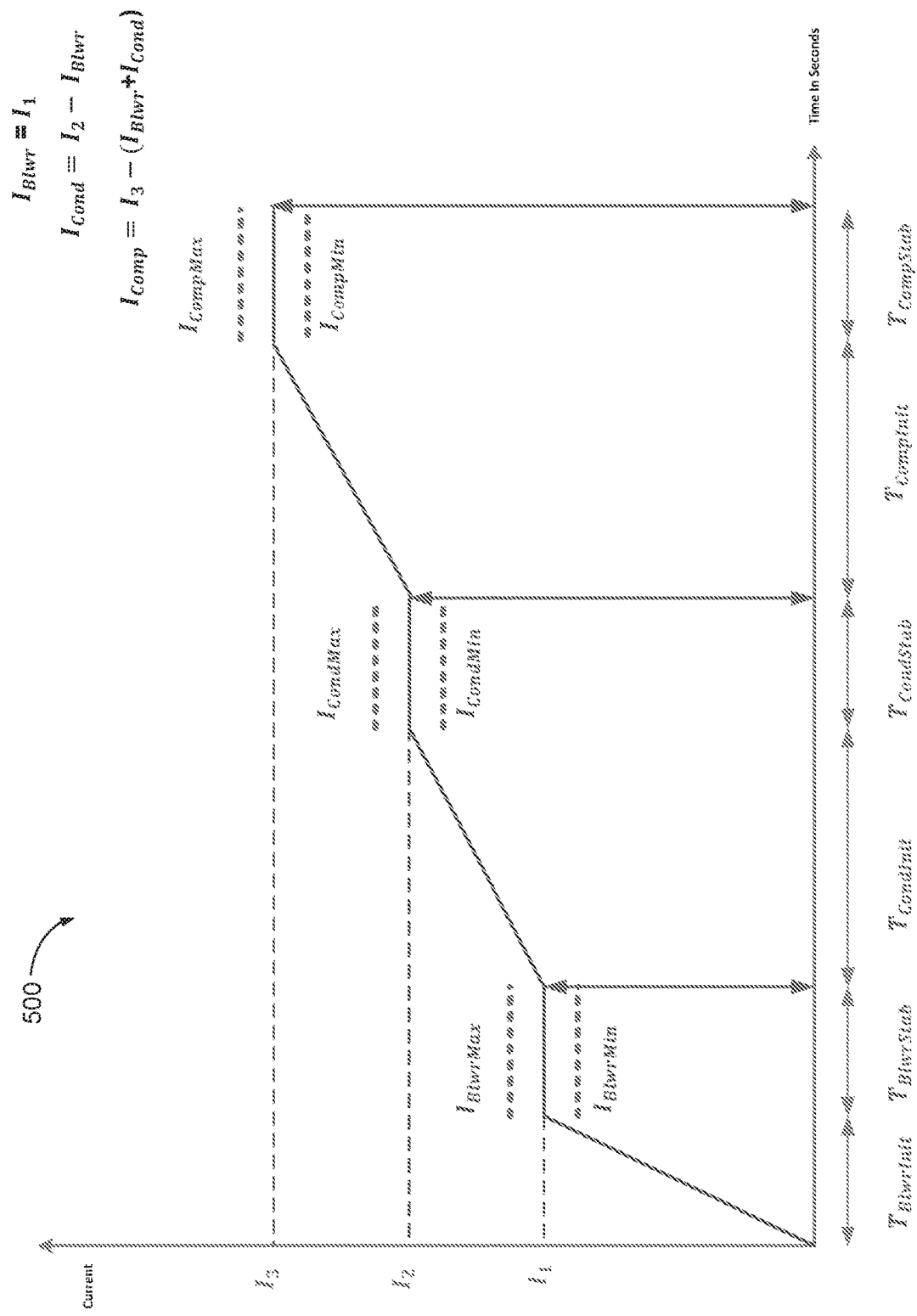
FIG. 5 illustrates a graphical representation of a start-up testing process for a vehicle air-conditioning system in accordance with some implementations.

The system determines (410) whether the evaporator blower is operating properly. In some implementations, the system waits a predetermined amount of time (e.g., $T_{BlwrStab}$, FIG. 5) after activating the evaporator blower before determining whether the evaporator blower is operating properly. For example, the system waits 2 seconds, 5 seconds, or 10 seconds. In some implementations, determining whether the evaporator blower is operating properly comprises: (1) determining a current drawn by the evaporator blower (e.g., utilizing current sensor 140, FIG. 1); and (2) determining whether the current drawn by the evaporator blower meets one or more predefined criteria. For example, determining whether the current drawn by the evaporator blower is between an upper and lower threshold. In some implementations, the one or more predefined criteria are based on the operating state of the evaporator blower (e.g., a rotational speed of the blower). For example, in accordance with a determination that the evaporator blower is operating at a low speed, the one or more predefined criteria include a criterion that the evaporator blower draw at least 1 amp of current. In this example, in accordance with a determination that the evaporator blower is operating at a high speed, the one or more predefined criteria include a criterion that the evaporator blower draw at least 7 amps of current. In some implementations, the controller 124 determines whether the evaporator blower is operating properly (e.g., utilizing cooling module 316 and/or error module 318, FIG. 3). In some implementations, determining whether the evaporator blower is operating properly comprises reading a battery current signal (e.g., bytes 0-3) in an auxiliary battery parameters message from the battery management system to obtain $I_{Blwr}$ (FIG. 5). In some implementations, determining whether the evaporator blower is operating properly comprises, for $T_{BlwrStab}$ seconds (FIG. 5), checking the $I_{Blwr}$ current value to be in the range ($I_{BlwrMin} < I_{Blwr} < I_{BlwrMax}$) for the selected blower speed to determine whether a blower operational failure is present.

In accordance with a determination that the evaporator blower is operating properly, the system activates (412) the condenser. In some implementations, activating the condenser comprises activating a condenser fan (e.g., condenser fan 130, FIG. 1). In some implementations, activating the condenser comprises supplying power to the condenser. In some implementations, activating the evaporator blower comprises setting a rotational speed for a condenser fan. In some implementations, the controller 124 activates the condenser (e.g., utilizing cooling module 316 and/or state module 314, FIG. 3). In some implementations, activating the condenser comprises ramping up the power supplied to the condenser (e.g., from power source 138, FIG. 1) over a predetermined amount of time (e.g., $T_{CondInit}$, FIG. 5). In some implementations, activating the condenser comprises commanding the condenser to a predetermined speed and then wait for $T_{CondInit}$ seconds (FIG. 5) for the condenser to initialize.

The system determines (414) whether the condenser is operating properly. In some implementations, the system waits a predetermined amount of time (e.g., $T_{CondStab}$, FIG. 5) after activating the condenser before determining whether the condenser is operating properly. For example, the system waits 2 seconds, 3 seconds, or 7 seconds. In some implementations, determining whether the condenser is operating properly comprises: (1) determining a current drawn by the condenser (e.g., utilizing current sensor 140, FIG. 1); and (2) determining whether the current drawn by the condenser meets one or more predefined criteria. For example, determining whether the current drawn by the condenser is between an upper and lower threshold. In some implementations, the one or more predefined criteria are based on the operating state of the condenser (e.g., a rotational speed of a condenser fan). In some implementations, the controller 124 determines whether the condenser is operating properly (e.g., utilizing cooling module 316 and/or error module 318, FIG. 3). In some implementations, determining whether the condenser is operating properly comprises reading a battery current signal in an auxiliary battery parameters message from the battery management system to obtain $I_{Cond}$ (FIG. 5). In some implementations, determining whether the condenser is operating properly comprises, for $T_{CondStab}$ seconds (FIG. 5), checking the $I_{Cond}$ current value to be in the range ($I_{CondMin} < I_{Cond} < I_{CondMax}$) to determine whether a condenser operational failure is present.

In accordance a determination that the condenser is operating properly, the system activates (416) the compressor. In some implementations, activating the compressor comprises supplying power to the compressor. In some implementations, the controller 124 activates the compressor (e.g., utilizing cooling module 316 and/or state module 314, FIG. 3). In some implementations, activating the compressor comprises ramping up the power supplied to the compressor (e.g., from power source 138, FIG. 1) over a predetermined amount of time (e.g., $T_{CompInit}$, FIG. 5). In some implementations, activating the compressor comprises turning the compressor on and setting it to a requested compressor speed. In some implementations, activating the compressor comprises waiting $T_{CompInit}$ seconds (FIG. 5) for the compressor to initialize.

The system determines (418) whether the compressor is operating properly. In some implementations, the system waits a predetermined amount of time (e.g., $T_{CompStab}$, FIG. 5) after activating the compressor before determining whether the compressor is operating properly. For example, the system waits 2 seconds, 3 seconds, or 7 seconds. In some implementations, determining whether the compressor is operating properly comprises: (1) determining a current drawn by the compressor (e.g., utilizing current sensor 140, FIG. 1); and (2) determining whether the current drawn by the compressor meets one or more predefined criteria. For example, determining whether the current drawn by the compressor is between an upper and lower threshold. In some implementations, the one or more predefined criteria are based on the operating state of the compressor. In some implementations, the controller 124 determines whether the compressor is operating properly (e.g., utilizing cooling module 316 and/or error module 318, FIG. 3). In some implementations, determining whether the compressor is operating properly comprises reading a battery current signal in an auxiliary battery parameters message from the battery management system to obtain $I_{Comp}$ (FIG. 5). In some implementations, determining whether the compressor is operating properly comprises, for $T_{CompStab}$ seconds (FIG. 5), checking the $I_{Comp}$ current value to be in the range $(I_{CompMin} < I_{Comp} < I_{CompMax})$ to determine whether a compressor operational failure is present.

In accordance a determination that the compressor is operating properly, the system completes (420) the start-up process. In some implementations, completing the start-up process comprises changing from a start-up mode to an operational mode. In some implementations, completing the start-up process comprises continuing running the evaporator blower, the condenser, and the compressor until a cease operation request is obtained. In some implementations, completing the start-up process comprises utilizing normal HVAC control based on the cooling request. In some implementations, completing the start-up process comprises entering a monitoring state, where the system monitors the current drawn from the power source (e.g., power source 138, FIG. 1) to detect any error conditions. In some implementations, the controller 124 completes the start-up process (e.g., utilizing cooling module 316 and/or state module 314, FIG. 3). In some implementations, completing the start-up process comprises transitioning to a cooling mode, where the evaporator blower, the condenser and the compressor continue running based on an HVAC control process, and where a heater relay is disabled. In some implementations, completing the start-up process comprises transitioning to an auto mode. In some implementations, in auto mode the evaporator blower, the condenser and the compressor continue running in during an auto-cool sub-mode based on an HVAC control process, and where a heater relay is disabled. In some implementations, in auto mode the blower, the condenser, and the compressor stop running under during an auto-heat sub-mode and heater relay is enabled In accordance with a determination that the system is not in the particular operating state, or in accordance with a determination that the activation request does not comprise the cooling request, the system bypasses (422) the start-up sequence. In some implementations, bypassing the start-up process comprises utilizing normal HVAC control based on the activation request. In some implementations, the normal HVAC control includes utilizing a control loop for automatic temperature control. In some implementations, the normal HVAC control includes adjusting the condenser, evaporator, and compressor based on a temperature of the vehicle and/or one or more temperature control settings (e.g., a target vehicle temperature) of the HVAC system.

In accordance with a determination that the evaporator blower is not operating properly, or in accordance a determination that the condenser is not operating properly, or in accordance a determination that the compressor is not operating properly, the system generates (424) an error condition. In some implementations, generating the error condition comprises generating an alert indicative of the component which is not operating properly. For example, the evaporator blower is not operating properly and the system generates an alert with a fault code that corresponds to the evaporator blower. In some implementations, the alert is sent to a user of the air-conditioning system (e.g., sent to an electronic device of the user). In some implementations, the alert is presented to a user of the air-conditioning system (e.g., presented on a display of the air-conditioning system). In some implementations, the alert is sent to a repair shop or technician to facilitate repairs (e.g., by scheduling a service appointment or ordering replacement parts). In some implementations, the controller 124 generates the error condition (e.g., utilizing error module 318, FIG. 3). In some implementations, the controller 124 generates the error condition (e.g., utilizing error module 318, FIG. 3). In some implementations, generating an error condition comprises, on blower operational failure, setting a particular bit (e.g., the bit 3 of Byte 3) in an auxiliary battery parameters message to 1 as indicative of the blower component failure. In some implementations, generating an error condition comprises, on condenser operational failure, setting a particular bit (e.g., the bit 4 of Byte 3) in an auxiliary battery parameters message to 1 as indicative of the condenser component failure. In some implementations, generating an error condition comprises, on compressor operational failure, setting a particular bit (e.g., the bit 5 of Byte 3) in an auxiliary battery parameters message to 1 as indicative of the compressor component failure.

Generating the error condition includes disabling (426) the air-conditioning system. In some implementations, the controller 124 disables the air-conditioning system (e.g., utilizing state module 314, FIG. 3). In some implementations, disabling the air-conditioning system includes ceasing to supply power to the evaporator blower, condenser, and/or compressor. In some implementations, disabling the air-conditioning system includes closing one or more flow values (e.g., values 212 and 214, FIG. 2) to disable refrigerant flow to one or more components of the air-conditioning system. In some implementations, disabling the air-conditioning system comprises inhibiting the compressor from turning on.

In some implementations, generating the error condition includes initiating (428) remedial action. In some implementations, initiating remedial action comprises notifying a service technician and/or a repair shop to facilitate repairs (e.g., by scheduling a service appointment or ordering replacement parts). In some implementations, initiating remedial action comprises starting a diagnostics process to determine potential solutions for the error condition. In some implementations, initiating remedial action comprises running the air-conditioning system without utilizing the component that was not operating properly. For example, an air-conditioning system includes a primary condenser and a secondary condenser and initiating remedial action comprises running the air-conditioning system utilizing only the secondary condenser in accordance with a determination that the primary condenser is not operating properly.

In some implementations, generating the error condition includes: (1) reading a particular bit (e.g., bit 3 of Byte 3) from the auxiliary battery parameters message in human-machine interface (HMI) software; (2) if the particular bit is set, (a) setting the fault code to a particular value (e.g., 4) to indicate blower component failure, and (b) showing the service symbol on a screen of the vehicle in which the air-conditioning system is installed; (3) reading a second bit (e.g., bit 4 of Byte 3) from the auxiliary battery parameters message in HMI software; (4) if the second bit is set, (a) setting the fault code to a second value (e.g., 5) indicative of condenser component failure, and (b) showing the service symbol on the screen of the vehicle; (5) reading a third particular bit (e.g., bit 5 of Byte 3) from the auxiliary battery parameters message in HMI software; (6) if the third bit is set, (a) setting the fault code to a third value (e.g., 6) for compressor component failure, and (b) showing the service symbol on the screen of the vehicle; and (7) displaying the fault code on a service screen.

In some implementations, the system includes: (1) a blower fan (e.g., evaporator fan 131); (2) a condenser fan (e.g., condenser fan 130); (3) a compressor (e.g., compressor 102); and (4) a battery system electrically coupled to the blower fan, condenser fan, and the compressor (e.g., battery management system 123), the battery system configured to: (a) while the condenser fan and compressor are off, start the blower fan; (b) after starting the blower fan, measure a first current drawn from the battery system, wherein the first current is indicative of current drawn by the blower fan; (c) in accordance with a determination that the first current meets one or more predefined criteria, start the condenser fan while leaving the compressor off; (d) after starting the condenser fan, measure a second current drawn from the battery system, wherein the difference between the second current and the first current is indicative of current drawn by the condenser fan; and (e) in accordance with a determination that the second current meets one or more predefined second criteria, start the compressor. In some implementations, the battery system comprises an 11V-25V battery. For example, in accordance with some implementations, power source 138 comprises a 12V or 24V battery. In some implementations, starting the blower fan comprises operation 408 supra. In some implementations, measuring the first current comprises operation 410 supra. In some implementations, starting the condenser fan comprises operation 412 supra. In some implementations, measuring the second current comprises operation 414 supra. In some implementations, starting the compressor comprises operation 416 supra.

In some implementations, the system: (1) after starting the compressor, measures a third current drawn from the battery system, where the difference between the third current and the second current is indicative of current drawn by the compressor; and (2) in accordance with a determination that the third current does not meet one or more predefined third criteria, generates an error condition. In some implementations, measuring the third current comprises operation 418 supra. In some implementations, generating the error condition comprises operation 424 supra.

In some implementations, measuring the first current drawn from the battery system comprises measuring the first current drawn from the battery system in accordance with a determination that a predetermined amount of time has elapsed since starting the blower fan. For example, measuring $I_1$ (FIG. 5) in accordance with a determination that $T_{BlwrStab} + T_{BlwrInt}$ has elapsed.

In some implementations, in accordance with a determination that the first current does not meet the one or more predefined criteria, the system generates an error condition. In some implementations, generating the error condition comprises operation 424 supra. In some implementations, generating the error condition comprises one or more of: (1) disabling the vehicle air-conditioning system; (2) alerting a user of the vehicle air-conditioning system of the error condition; and (3) initiating a repair procedure. In some implementations, alerting the user via a user interface and/or the vehicle bus. In some implementations, initiating a repair procedure by ordering a spare part, scheduling a service appointment, notifying a technician, and the like. In some implementations, other components (e.g., the compressor) are tested before disabling the system. In some implementations, disabling the system comprises testing one or more additional components of the system; and after testing the one or more additional components, disabling the system. In some implementations, disabling the system comprises operation 426 supra. In some implementations, initiating a repair procedure comprises operation 428 supra.

In some implementations, the one or more predefined criteria comprise a criterion that the first current is between an upper current threshold and a lower current threshold. For example, a criterion that $I_1$ (FIG. 5) is between $I_{BlwrMax}$ and $I_{BlwrMin}$. In some implementations, the one or more predefined criteria are based on a current speed of the blower fan. For example, if the blower fan has a first speed the lower current threshold is at a first value (e.g., 1 amp), and if the blower fan has a second speed the lower current threshold is a second value (e.g., 4 amps).

In some implementations: (1) the vehicle air-conditioning system further includes a current sensor (e.g., current sensor 140); (2) measuring the first current comprises measuring the first current at the current sensor; and (3) measuring the second current comprises measuring the second current at the current sensor. For example, measuring the first current comprises measuring $I_1$ (FIG. 5) with the current sensor 140, and measuring the second current comprises measure $I_2$ with the current sensor 140.

In some implementations, starting the blower fan comprises ramping up power provided to the blower fan over a predetermined amount of time. For example, ramping up current provided from a starting value of 0 amps to a final value of $I_1$ (FIG. 5) over $T_{BlwrInit}$. In some implementations, ramping up the power comprises linearly ramping up the power. In some implementations, ramping up the power comprises non-linearly ramping up the power.

In some implementations, starting the blower fan comprises starting the blower fan in response to one of: a signal received from a thermostat; and a command received from a user of the vehicle air-conditioning system. For example, starting the blower fan in response to an activation request from a thermostat or a user, such as the activation request obtained in operation 402 supra.

In some implementations, starting the blower fan comprises starting the blower fan in accordance with a determination that the vehicle air-conditioning system is in a particular operating state. In some implementations, the operating state comprises an operating state with an active battery management system and voltage levels that are between predefined limits.

In some implementations, measuring the first current comprises monitoring the first current for a particular time interval. For example, monitoring $I_1$ (FIG. 5) over $T_{BlwrStab}$ to determine if I1 stays between $I_{BlwrMax}$ and $I_{BlwrMin}$ for the duration of $T_{BlwrStab}$. In some implementations, monitoring the first current for the particular time interval comprises repeatedly measuring the first current over the particular time interval. In some implementations, monitoring the first current for the particular time interval comprises generating an average current for the particular time interval.

In some implementations, the system determines whether an evaporation sensor (e.g., sensor 118, FIG. 1) is operating properly. For example, the system determines whether the evaporation sensor is shorted or missing. In accordance with a determination that the evaporation sensor is not operating properly, the system generates an error condition. In some implementations, the system determines whether the refrigerant pressure meets one or more predefined criteria. For example, whether the refrigerant pressure exceeds a high pressure threshold. In accordance with a determination that the refrigerant pressure does not meet one or more predefined criteria, the system generates an error condition.

In some implementations, the system is configured to: (a) while the evaporator fan and compressor are off, start the condenser fan; (b) after starting the condenser fan, measure a first current drawn from the battery system, wherein the first current is indicative of current drawn by the condenser fan; (c) in accordance with a determination that the first current meets one or more predefined criteria, start the evaporator fan while leaving the compressor off; (d) after starting the evaporator fan, measure a second current drawn from the battery system, wherein the difference between the second current and the first current is indicative of current drawn by the evaporator fan; and (e) in accordance with a determination that the second current meets one or more predefined second criteria, start the compressor. In some implementations, the evaporator blower is activated before the condenser so as to notify a user that the system is in a start-up process. In some circumstances, activation of the evaporator blower is noticeable by an operator of the vehicle, whereas activation of the condenser fan is not. Therefore, activating the evaporator blower provides feedback to the user/operator that the system is active.

It should be understood that the particular order in which the operations in FIGS. 4A-4C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 300 described above with respect to FIGS. 4A-4C.

FIG. 5 illustrates a graphical representation of a start-up testing process 500 for a vehicle air-conditioning system (e.g., air-conditioning system 100, FIG. 1) in accordance with some implementations. FIG. 5 shows a first time interval $T_{BlwrInt}$ where current is drawn from the power source by a blower (e.g., a blower of evaporator 106, FIG. 1), corresponding to activation of the blower. FIG. 5 also shows a second interval $T_{BlwrStab}$ where the current drawn from the power source ($I_1$) is measured to determine whether it is between an upper threshold, $T_{BlwrMax}$, and a lower threshold, $T_{BlwrMin}$. As shown in FIG. 5, $I_1$ is indicative of the current drawn by the blower, $I_{Blwr}$.

FIG. 5 also shows a third time interval $T_{CondInt}$ where current is drawn from the power source by a blower and a condenser (e.g., condenser 104, FIG. 1), corresponding to activation of the condenser. FIG. 5 further shows a fourth interval $T_{CondStab}$ where the current drawn from the power source ($I_2$) is measured to determine whether it is between an upper threshold, $T_{CondMax}$, and a lower threshold, $T_{CondMin}$. As shown in FIG. 5, $I_2$-$I_{Blwr}$ is indicative of the current drawn by the condenser, $I_{Cond}$.

FIG. 5 also shows a fifth time interval $T_{CompInt}$ where current is drawn from a power source by a blower, a condenser, and a compressor (e.g., compressor 102, FIG. 1), corresponding to activation of the compressor. FIG. 5 further shows a sixth interval $T_{CompStab}$ where the current drawn from the power source ($I_3$) is measured to determine whether it is between an upper threshold, $T_{CompMax}$, and a lower threshold, $T_{CompMin}$. As shown in FIG. 5, $I_3$-($I_{Blwr}$+$I_{Cond}$) is indicative of the current drawn by the compressor, $I_{Comp}$.

Table 1 infra includes representative values for the variables shown in FIG. 5. The values shown in Table 1 are for example purposes only and are not intended to limit the present disclosure in any manner.

TABLE 1 example timing and current values

| | | |
|---|---|---|
| $T_{BlwrInit}$ | Blower Initialization time | 2 Sec |
| $T_{BlwrStab}$ | Blower Stabilization time | 5 Sec |
| $T_{CondInit}$ | Condenser Initialization time | 7 Sec |
| $T_{CondStab}$ | Condenser Stabilization time | 3 Sec |
| $T_{CompInit}$ | Compressor Initialization time | 7 Sec |
| $T_{CompStab}$ | Compressor Stabilization time | 3 Sec |
| $I_{BlwrMin(Spd1)}$ | Maximum Blower Current Limit (Blower Speed 1) | 1.0 Amps |
| $I_{BlwrMax(Spd1)}$ | Minimum Blower Current Limit (Blower Speed 1) | 20.0 Amps |
| $I_{BlwrMin(Spd2)}$ | Maximum Blower Current Limit (Blower Speed 2) | 4.0 Amps |
| $I_{BlwrMax(Spd2)}$ | Minimum Blower Current Limit (Blower Speed 2) | 20.0 Amps |
| $I_{BlwrMin(Spd3)}$ | Maximum Blower Current Limit (Blower Speed 3) | 7.0 Amps |
| $I_{BlwrMax(Spd3)}$ | Minimum Blower Current Limit (Blower Speed 3) | 20.0 Amps |
| $I_{CondMin}$ | Maximum Condenser Current Limit | 2.0 Amps |
| $I_{CondMax}$ | Minimum Condenser Current Limit | 8.0 Amps |
| $I_{CompMin}$ | Maximum Compressor Current Limit | 15.0 Amps |
| $I_{CompMax}$ | Minimum Compressor Current Limit | 60.0 Amps |

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first condition could be termed a second condition, and, similarly, a second condition could be termed a first condition, without departing from the scope of the various described implementations. The first condition and the second condition are both conditions, but they are not the same condition.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising,"

when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for starting-up a vehicle air-conditioning system, comprising:
    at the vehicle air-conditioning system including a blower fan, a condenser fan, and a compressor, all of which are electrically coupled to a battery system:
    while the condenser fan and compressor are off, starting the blower fan; after starting the blower fan, measuring a first current drawn from the battery system, wherein the first current is indicative of current drawn by the blower fan;
    and in accordance with a determination that the first current meets one or more predefined condenser fan starting criteria, which indicate that the blower fan is operating properly:
    starting the condenser fan while leaving the compressor off, after starting the condenser fan, measuring a second current drawn from the battery system, wherein the difference between the second current and the first current is indicative of current drawn by the condenser fan;
    and in accordance with a determination that the second current, or the difference between the second current and the first current, meets one or more predefined compressor starting criteria, which indicate that the condenser fan is operating properly, starting the compressor, wherein the one or more predefined condenser fan starting criteria differ from the one or more predefined compressor starting criteria.

2. The method of claim 1, further comprising:
    after starting the compressor, measuring a third current drawn from the battery system, wherein the difference between the third current and the second current is indicative of current drawn by the compressor; and
    in accordance with a determination that the third current, or the difference between the third current and the second current, does not meet one or more predefined additional criteria, generating an error condition.

3. The method of claim 1, wherein measuring the first current drawn from the battery system comprises measuring the first current drawn from the battery system in accordance with a determination that a predetermined amount of time has elapsed since starting the blower fan.

4. The method of claim 1, further comprising, in accordance with a determination that the first current does not meet the one or more predefined condenser fan starting criteria, generating an error condition.

5. The method of claim 4, wherein generating the error condition comprises one or more of:
    disabling the vehicle air-conditioning system;
    alerting a user of the vehicle air-conditioning system of the error condition; and
    initiating a repair procedure.

6. The method of claim 1, wherein the one or more predefined condenser fan starting criteria comprise a criterion that the first current is between an upper current threshold and a lower current threshold.

7. The method of claim 1, wherein the vehicle air-conditioning system further includes a current sensor, wherein measuring the first current comprises measuring the first current at the current sensor, and wherein measuring the second current comprises measuring the second current at the current sensor.

8. The method of claim 1, wherein starting the blower fan comprises ramping up power provided to the blower fan over a predetermined amount of time.

9. The method of claim 1, wherein starting the blower fan comprises starting the blower fan in response to one of:
    a signal received from a thermostat; and
    a command received from a user of the vehicle air-conditioning system.

10. The method of claim 1, wherein starting the blower fan comprises starting the blower fan in accordance with a determination that the vehicle air-conditioning system is in a particular operating state.

11. The method of claim 1, wherein measuring the first current comprises monitoring the first current for a particular time interval.

12. A vehicle air-conditioning system, comprising:
    a blower fan;
    a condenser fan;
    a compressor; and
    a battery system electrically coupled to the blower fan, condenser fan, and the compressor;
    wherein the vehicle air-conditioning system is configured to:
    while the condenser fan and compressor are off, start the blower fan;
    after starting the blower fan, measure a first current drawn from the battery system, wherein the first current is indicative of current drawn by the blower fan; and
    in accordance with a determination that the first current meets one or more predefined condenser fan starting criteria, which indicate that the blower fan is operating properly:
    start the condenser fan while leaving the compressor off;
    after starting the condenser fan, measure a second current drawn from the battery system, wherein the difference between the second current and the first current is indicative of current drawn by the condenser fan; and
    in accordance with a determination that the second current, or the difference between the second current and the first current, meets one or more predefined compressor starting criteria, which indicate that the condenser fan is operating properly, start the compressor, wherein the one or more predefined condenser fan starting criteria differ from the one or more predefined compressor starting criteria.

13. The vehicle air-conditioning system of claim 12, wherein the vehicle air-conditioning system is further configured to:

after starting the compressor, measure a third current drawn from the battery system, wherein the difference between the third current and the second current is indicative of current drawn by the compressor; and in accordance with a determination that the third current, or the difference between the third current and the second current, does not meet one or more predefined additional criteria, generate an error condition.

14. The vehicle air-conditioning system of claim 12, wherein the vehicle air-conditioning system is further configured to generate an error condition in accordance with a determination that the first current does not meet the one or more predefined condenser fan starting criteria.

15. The vehicle air-conditioning system of claim 14, wherein generating the error condition comprises one or more of:

disabling the vehicle air-conditioning system;
alerting a user of the vehicle air-conditioning system of the error condition; and
initiating a repair procedure.

16. The vehicle air-conditioning system of claim 12, wherein the one or more predefined condenser fan starting criteria comprise a criterion that the first current is between an upper current threshold and a lower current threshold.

17. The vehicle air-conditioning system of claim 12, wherein the battery system includes a current sensor, and wherein measuring the first current comprises measuring the first current at the current sensor, and wherein measuring the second current comprises measuring the second current at the current sensor.

18. The vehicle air-conditioning system of claim 12, wherein starting the blower fan comprises starting the blower fan in response to one of:

a signal received from a thermostat; and
a command received from a user of the vehicle air-conditioning system.

19. The vehicle air-conditioning system of claim 12, wherein starting the blower fan comprises starting the blower fan in accordance with a determination that the vehicle air-conditioning system is in a particular operating state.

20. The vehicle air-conditioning system of claim 12, wherein measuring the first current comprises monitoring the first current for a particular time interval.

* * * * *